United States Patent [19]

Woods

[11] Patent Number: 5,050,288

[45] Date of Patent: Sep. 24, 1991

[54] DYNAMIC DIMENSIONAL CONTROL MATRIX SYSTEM

[75] Inventor: Quentin T. Woods, Woodinville, Wash.

[73] Assignee: The Boeing Company, Seattle, Wash.

[21] Appl. No.: 451,425

[22] Filed: Dec. 15, 1989

[51] Int. Cl.⁵ .............................................. B23P 11/00
[52] U.S. Cl. ...................................... 29/407; 29/432; 29/525.1; 29/525.2; 408/1 R
[58] Field of Search .................... 29/407, 525.1, 525.2, 29/702, 703, 432, 432.1, 432.2, 446, 402.14, 402.12, 34 B; 408/1 R

[56] References Cited

U.S. PATENT DOCUMENTS

| | | | |
|---|---|---|---|
| 1,949,007 | 2/1934 | Butler | 33/174 |
| 2,110,752 | 3/1938 | Wright | 113/116 |
| 2,403,569 | 7/1946 | Watter | 244/124 |
| 2,430,438 | 11/1947 | Watter et al. | 29/148.2 |
| 2,441,858 | 5/1948 | Watter | 29/148.2 |
| 2,451,454 | 10/1948 | Watter | 29/148.2 |
| 2,451,458 | 10/1948 | Watter | 244/124 |
| 2,558,819 | 7/1951 | Chausson | 244/124 |
| 2,567,124 | 9/1951 | Roberts | 244/124 |
| 2,615,234 | 10/1952 | Dumbleton | 29/148.2 |
| 2,959,383 | 11/1960 | Pavlecka | 244/124 |
| 3,429,023 | 2/1969 | Blythe et al. | 29/404 |
| 3,827,661 | 8/1974 | Ryan et al. | 244/123 |
| 3,935,633 | 2/1976 | Bunker | 29/469 |
| 4,203,204 | 5/1980 | Murphy | 29/703 |
| 4,310,964 | 1/1982 | Murphy | 29/469 |

FOREIGN PATENT DOCUMENTS

| | | | |
|---|---|---|---|
| 62-88547 | 4/1987 | Japan | 29/701 |
| 62-88548 | 4/1987 | Japan | 29/701 |
| 1328154 | 8/1987 | U.S.S.R. | 29/701 |

Primary Examiner—Joseph M. Gorski
Attorney, Agent, or Firm—Bruce A. Kaser

[57] ABSTRACT

The invention is a method for continually adjusting fastener drilling and installation in response to part growth during assembly of certain aircraft components. A series of normal installation locations are initially selected where fasteners are to be sequentially installed one at a time. Part growth is monitored at a certain reference point ahead of the advancement of fastener installation, and is sensed immediately after each installation. The position of the next-in-line installation is adjusted proportionately to the part growth which resulted from the previous installation, and so on, until the series is installed.

3 Claims, 17 Drawing Sheets

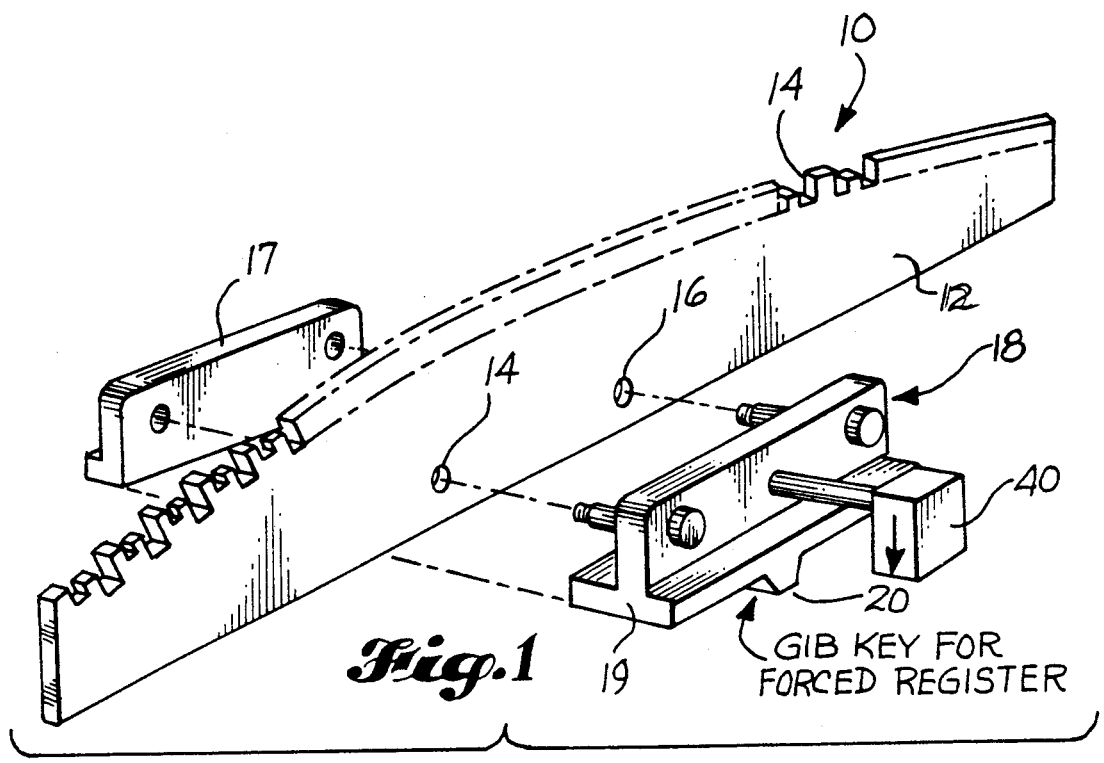
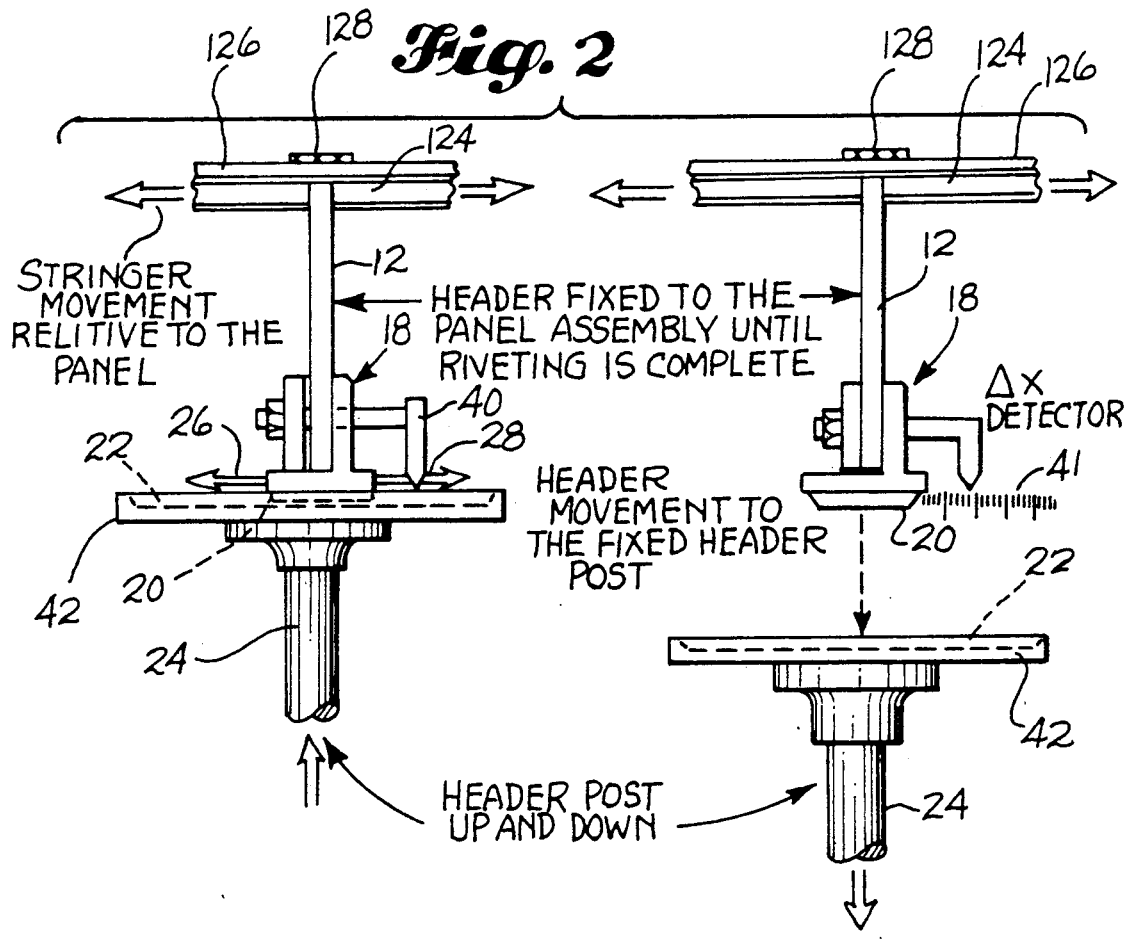

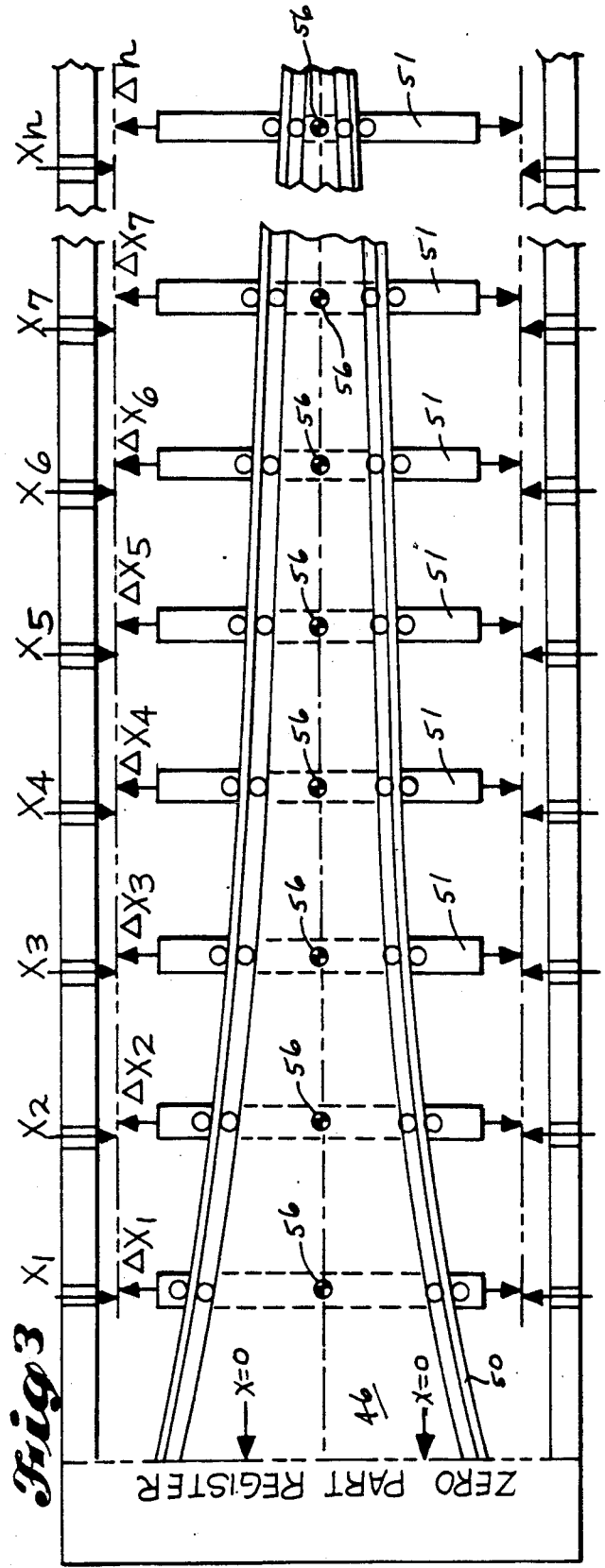

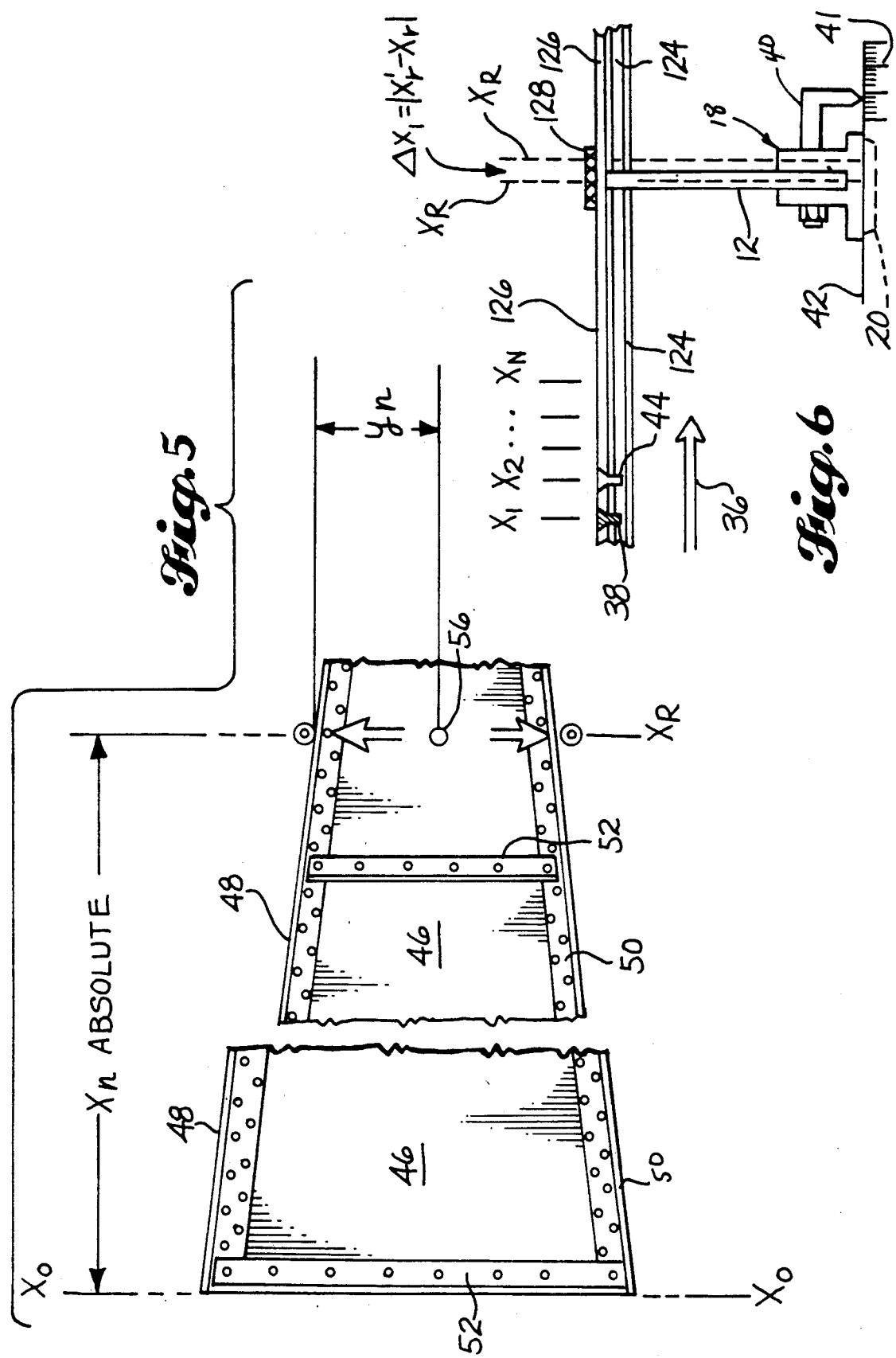

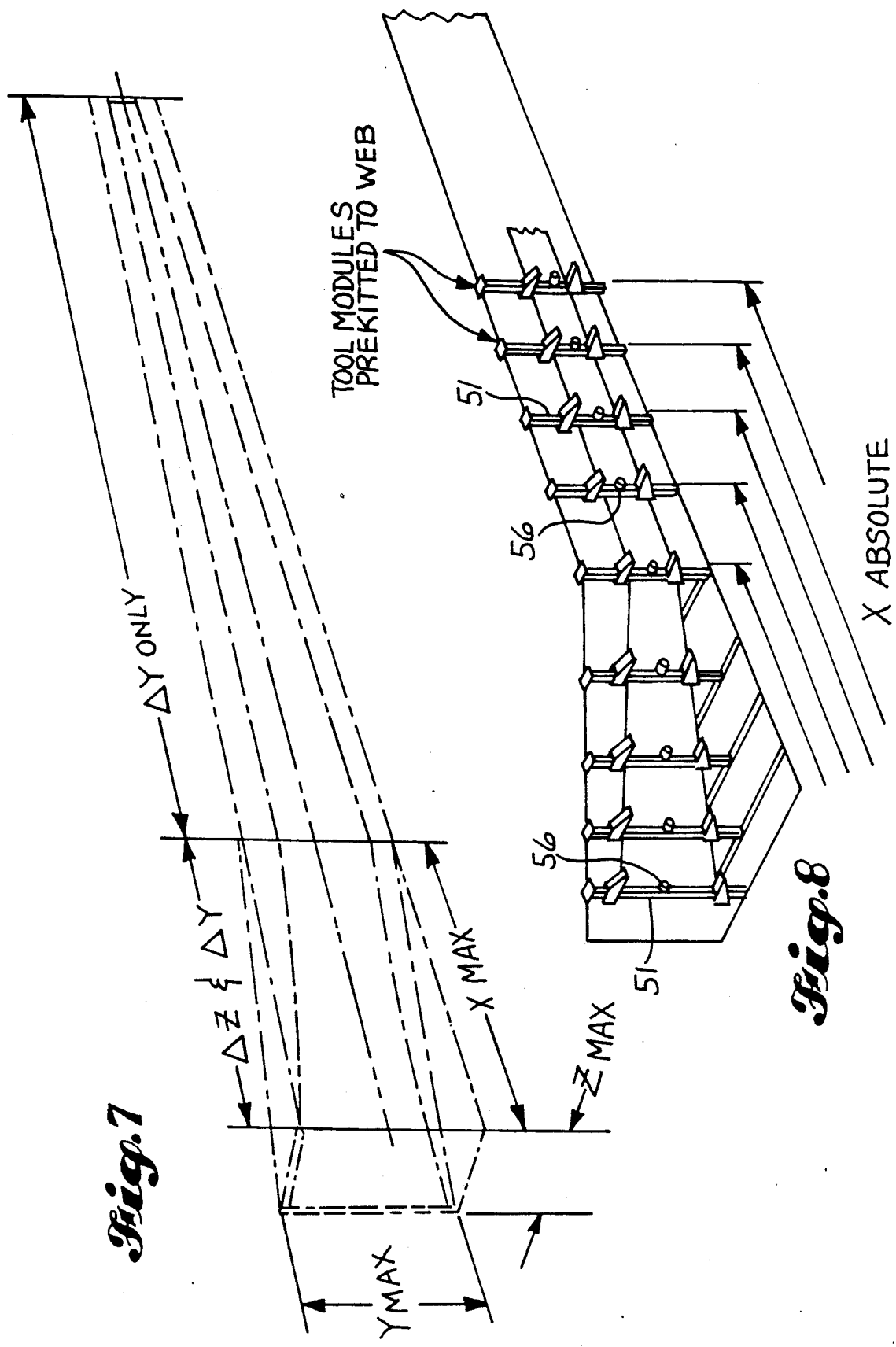

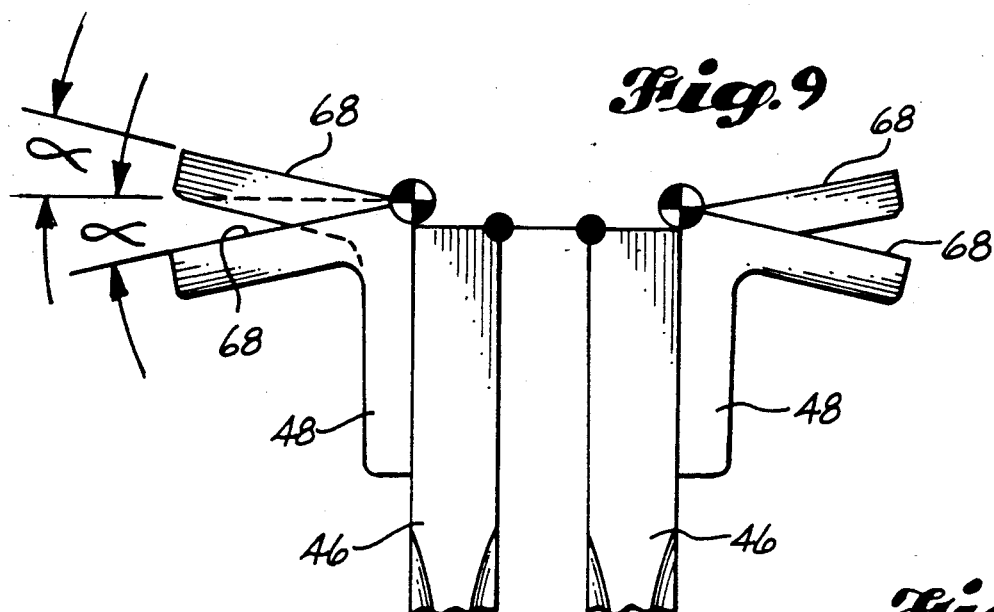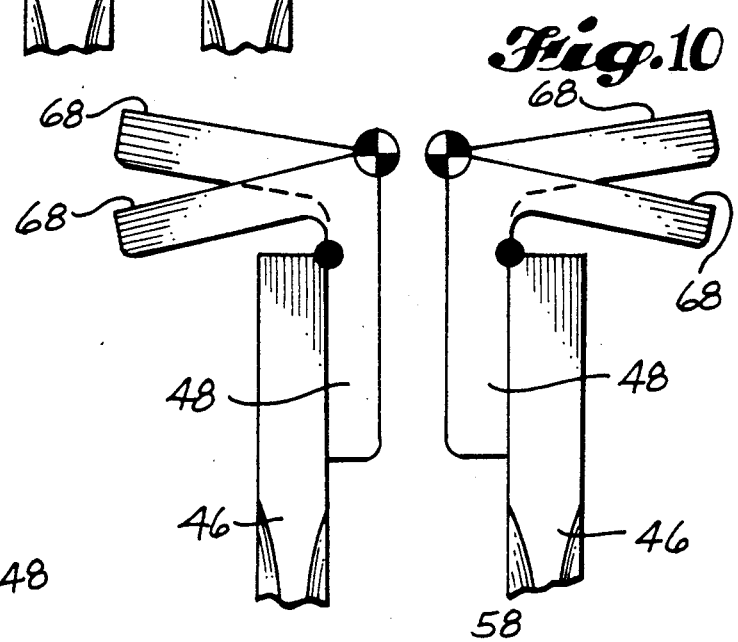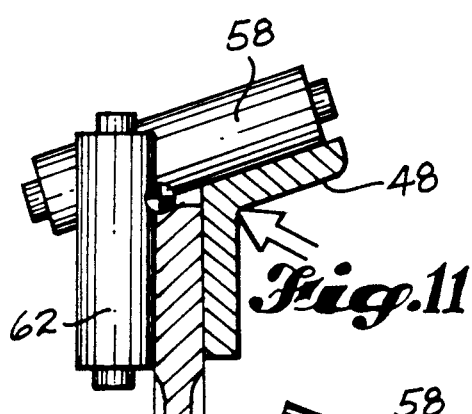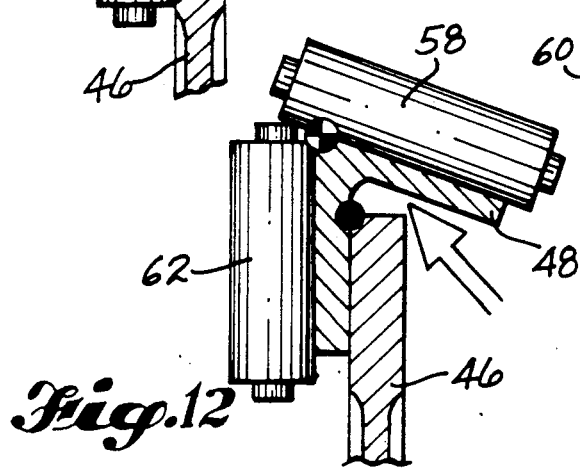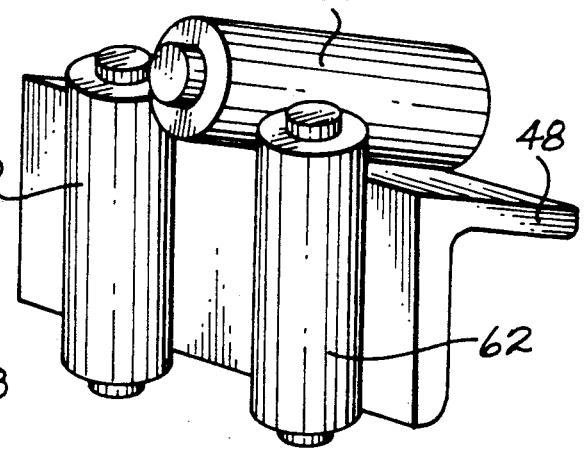

INSTALLED FASTENERS (BOTH ENDS)

DRILLED, BUT NOT COLD WORKED

CAMBERED AFTER COLD WORKING THE ENDS. THE CAMBER IS A FUNCTION OF THE TWO CROSS SECTIONAL AREAS OF THE PLATES

INTERVENING INTERFERENCE FASTENERS ARE INSTALLED

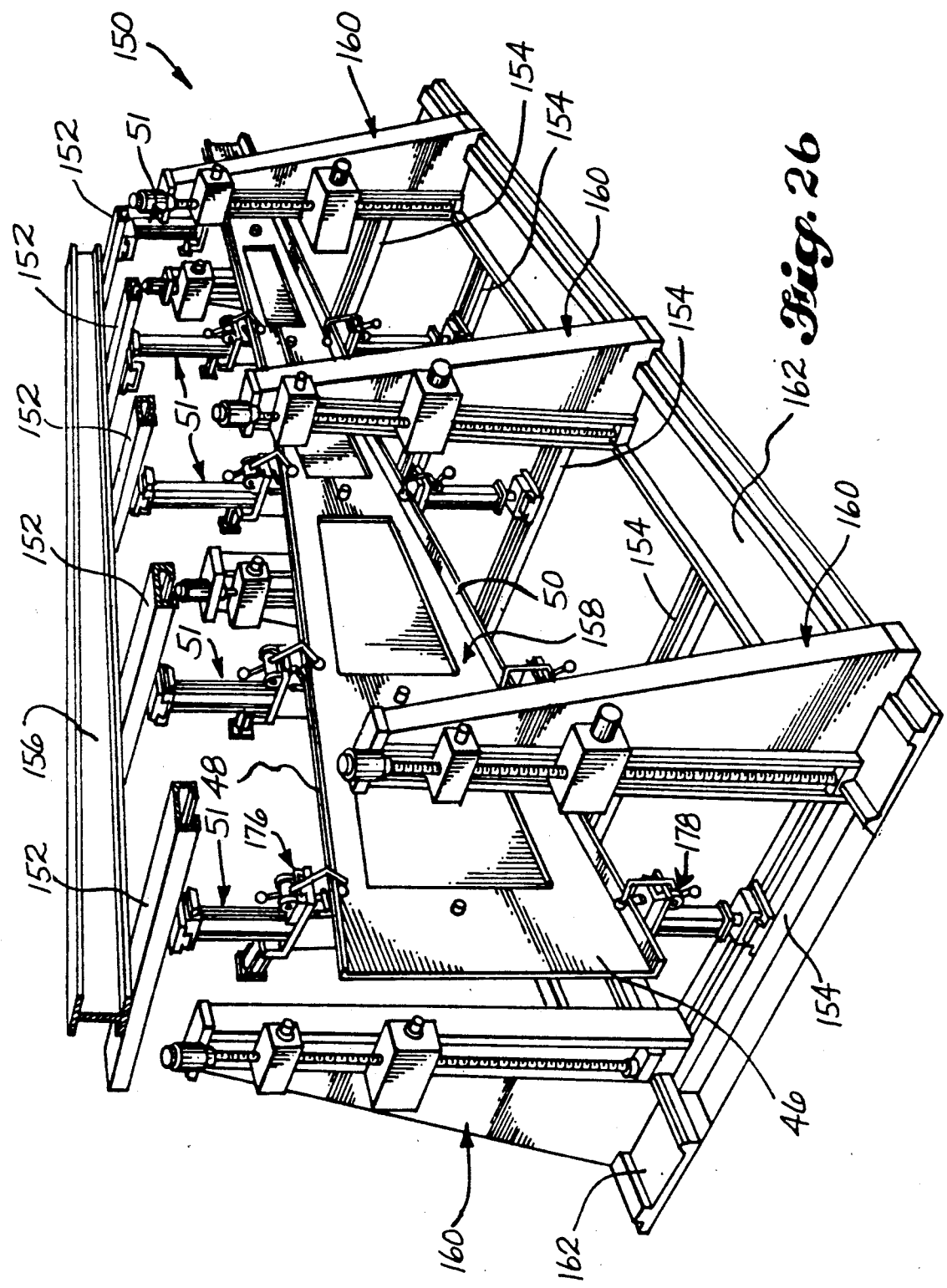

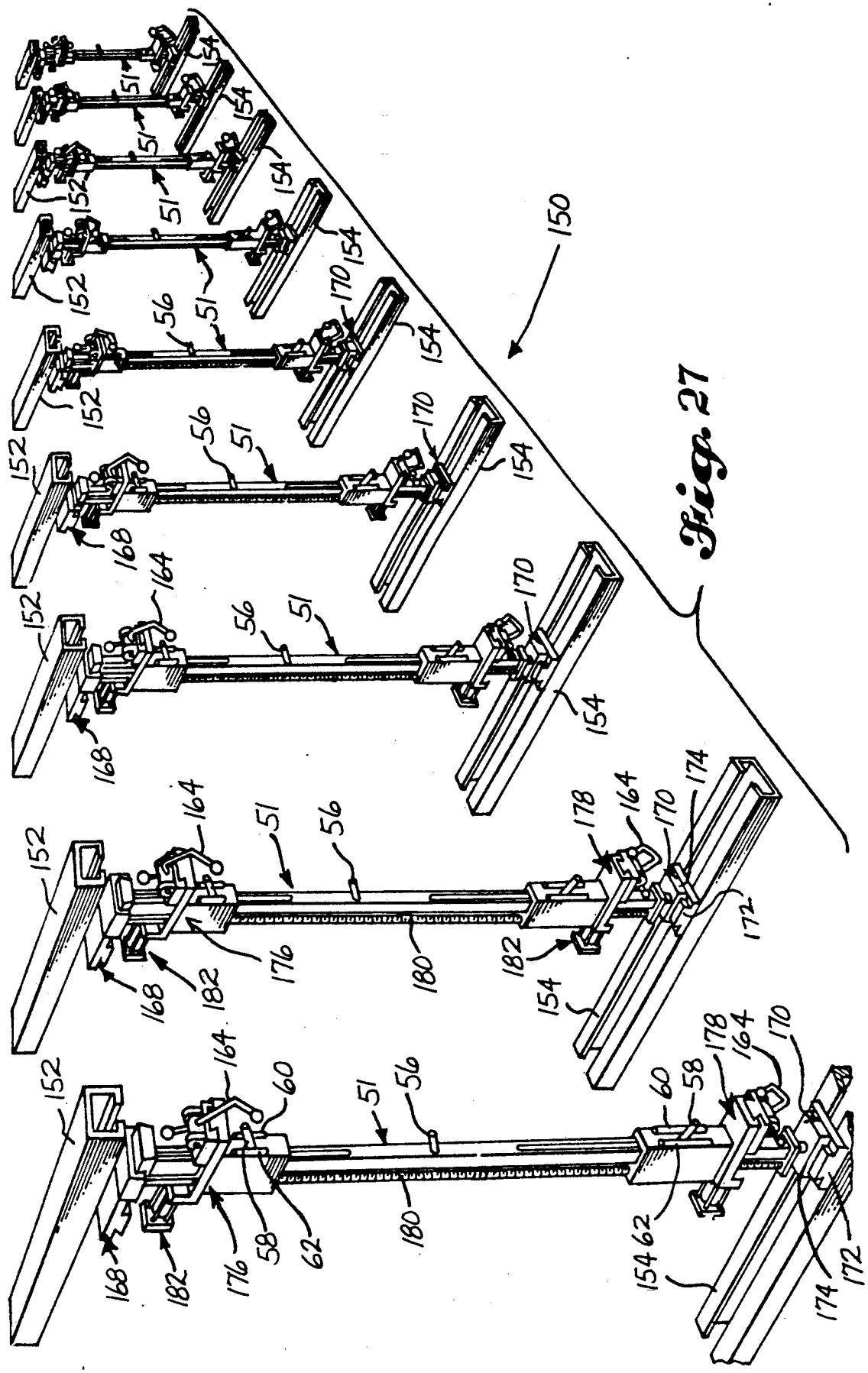

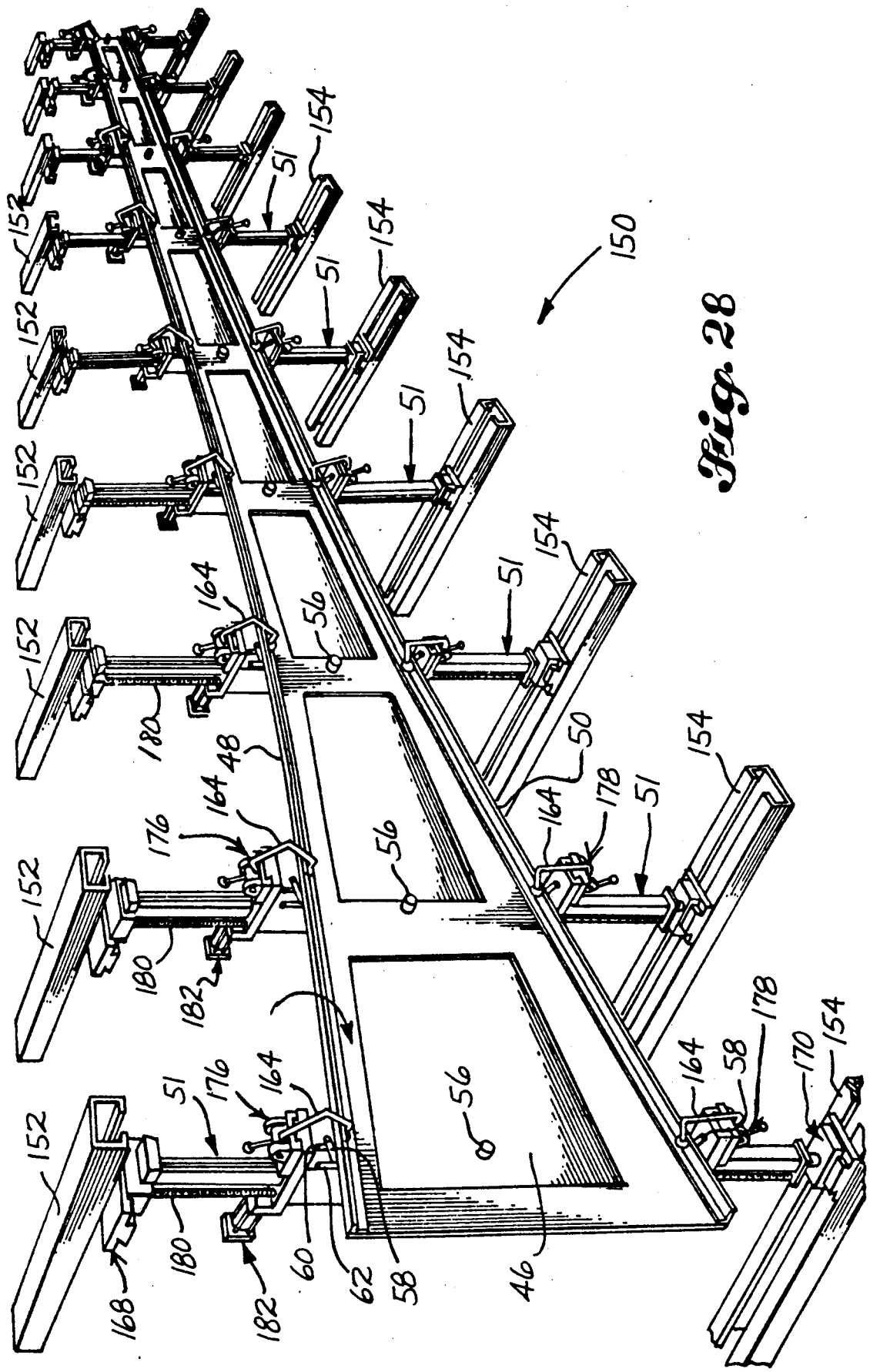

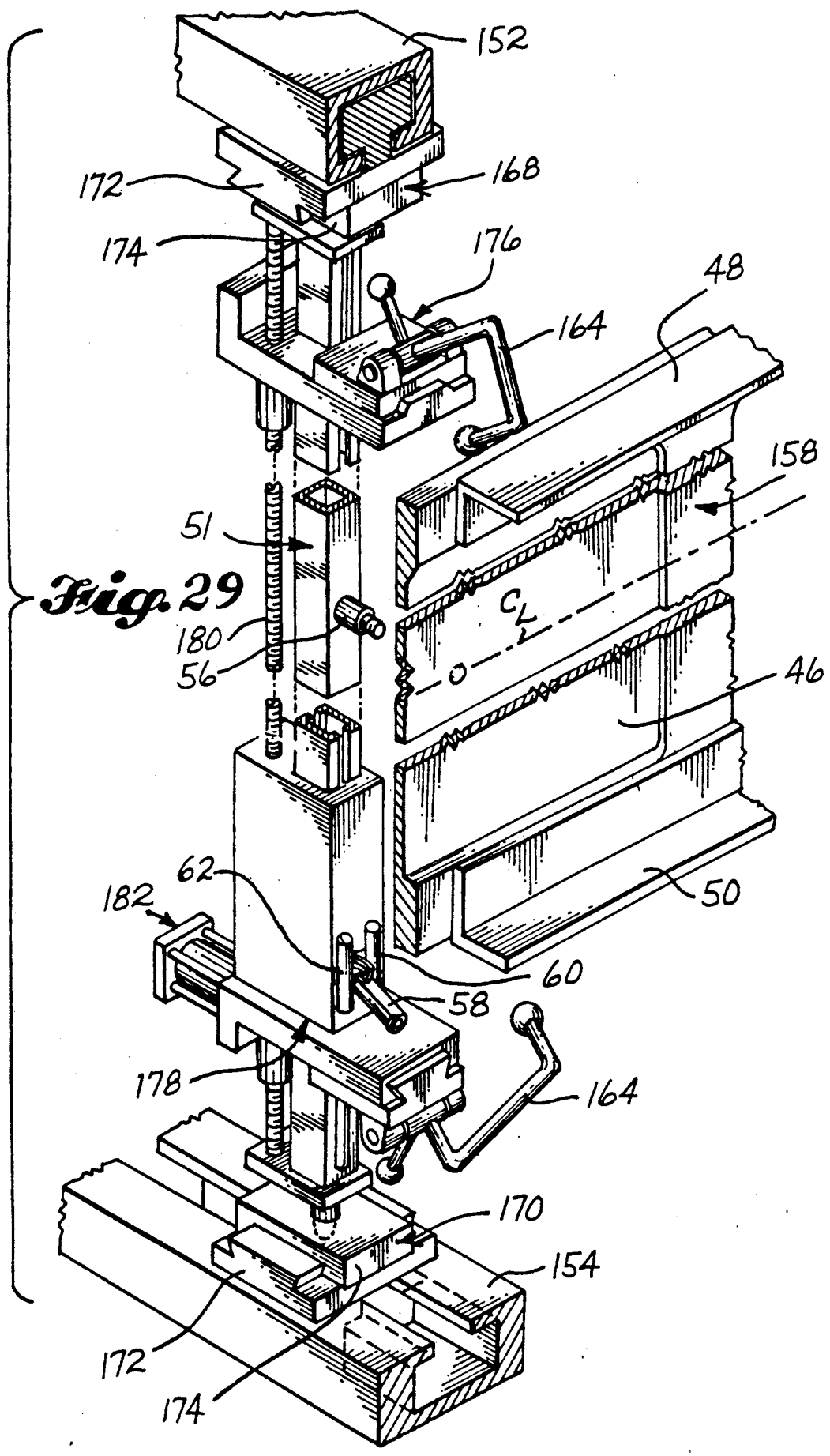

DYNAMIC DIMENSIONAL CONTROL MATRIX SYSTEM

DESCRIPTION

1. Technical Field

This invention generally relates to airframe and aircraft manufacturing operations, and more particularly, to the assembly of large aircraft subassemblies, such as body panels, wing panels and spar structures.

2. Related Applications

This is the last of a series of five related and commonly-owned applications, all by the same inventor, and all pertaining to assembly jigs and fixtures, including methods for assembling aircraft subassemblies.

The first application was filed in the U.S. Patent and Trademark Office (USPTO) on or about July 6, 1988 (Ser. No. 216,702) and relates to an assembly jig and method for making wing panels. The second was filed on or about Oct. 26, 1988 (Ser. No. 262,894) and relates to an assembly jig and method for making wing spars. The third was also filed on or about Oct. 28, 1988 (Ser. No. 263,686) and relates to a wing major assembly jig. The fourth is a divisional of the first and was filed on or about Nov. 17, 1989 (Ser. No. 438,715).

All of the preceding applications are co-pending as of the filing date of the present application. The information contained in these applications, including but not limited to the various jigs and methods disclosed in them, are herein incorporated by reference as they are germane to the development of the invention disclosed here. Certain drawings and description from these applications are directly included here because it is believed such information is essential in order to understand the present invention.

BACKGROUND INFORMATION

The present invention provides an assembly method which preferably is to be used in connection with the type of jig disclosed in application Ser. Nos. 216,702 and 262,894 (the '702 and '894 applications). That is, these applications respectively disclose assembly jigs for making wing panels and spars which hold together the pre-assembled parts of their respective wing components without using tack or other interference fasteners.

Briefly, these jigs permit the individual parts of their respective assemblies to expand or contract separately, in a defined, predetermined orientation, as they are subsequently assembled or combined with other parts by the use of bolts, rivets and other such interference fasteners. Without such individual freedom of part movement during assembly, the resultant or fastened-together assembly will have undesirable induced residual manufacturing stresses, as well as dimensional distortions. These residual stresses subtract from individual fastener joint strength as well as the overall strength of the assembly.

Using jigs that permit individual part movement as a way to avoid residual stresses during assembly is but a single aspect of a larger problem. It is also necessary to take into account the dimensional impact of all the part movements resulting from the installation of all fasteners required by the assembly.

During the course of assembly, the parts being assembled are constantly moving relative to each other, and the resulting assembly, or subassembly as the case may be, is also moving continually during the assembly sequence. This can be described as a "dynamic dimensional matrix system" that exists during the assembly operation. This latest invention disclosed here defines the necessary method for dynamically controlling assembly of such a matrix system that is applicable, but not necessarily limited to, the previously-referenced applications.

As was discussed in some depth in the '702 application, and to a certain extent in the '894 application, past methods of manufacturing wing components, where tack fasteners were used to hold parts together prior to final assembly, created induced stresses caused by part expansion that is restricted by the tack fasteners holding the parts together at common points. This results in compressive stresses in one part, tensile stresses in a second part, and shear stresses in the fasteners, as well as an overall subassembly expansion, and a torsional or bending stress in the completed subassembly. The nature of this problem is illustrated in FIGS. 14–16 herein, which are labeled "prior art."

Referring first to FIG. 14, there are many instances in an aircraft manufacturing operation where a first part a is initially joined or connected to a second part b by a plurality of fasteners c at opposite ends. Typically, parts a, b are elongated members that are finally assembled, subsequent to the end installations at c, by using numerous intervening fasteners distributed along their length.

As is indicated in FIG. 14, typically all the holes d, e for the intervening fasteners are drilled prior to their installation, and are drilled at the same time as the bores for the end fasteners c. At the time of such drilling, most of the bores d, e remain substantially in registration. However, installation of any interference fastener or a riveted fastener will coldwork and expand its respective hole or bore through each part (a and b) in the assembly which is joined together. Therefore, unless the cross-sectional area of each part (a and b) is identical, the amount of elongation of each will be different.

As illustrated by FIG. 14, part b has a smaller cross-sectional area than part a, and it will therefore elongate at a greater rate than a. Since the two parts are first fastened together at c, this causes an initial part expansion, and prevents further expansion created by subsequent installation of the intervening fasteners. This creates undesirable stored strain energy and residual stresses, and imposes shear stresses across the installed fasteners at the interface between the two parts.

By way of further explanation, and referring now to FIG. 15, as mentioned above, the fasteners c shown there are first installed at opposite ends of the parts a, b prior to installation of fasteners in the interval between. Depending on the nature and dimensions of the materials involved, it is not unusual for the end installations to initially cause unequal part expansions. In FIG. 15, for example, the greater expansion is schematically shown in part b, because of its smaller cross-section. This causes it to go into compression. At the same time, part a is placed in tension. The end result can be a slight camber in the parts a, b.

The predrilled bores d, e in the parts will experience axial shift because of the cambering effect described above, which takes them out of registration with each other. This not only adversely affects individual fastener installation of the intervening fasteners from the very beginning, but as such fasteners are subsequently installed, each individual fastener installation exacerbates the problem by making an individual contribution to part expansion. The result is additional induced stresses that create bending or warping of the type illustrated in FIG. 16.

The residual stresses created by this effect can be very significant and very undesirable. A person familiar with aircraft construction can appreciate the magnitude of the stresses between a spar chord and spar web, for example, where the ratios of the cross-sectional areas between the parts are over 1,000 to 1, and the length of the parts can be as much as 100 to 200 feet. Likewise, the ratios between wing stringers and a wing skin can exceed 5,000 to 1 over lengths of 100 to 200 feet. It is these kinds of problems which are addressed and solved by the present invention.

The invention provides dynamic dimensional control during the drilling and installation of interference fasteners. The invention does not inhibit individual part expansion due to sequential and progressive fastener installation. A dimensional matrix system is employed to continually detect and compensate for part movement to achieve preconceived dimensional values established for the completed assembly or subassembly. Detection and compensation for part movement on a continual basis either eliminates or drastically reduces induced stresses and residual strains. The invention will become better understood upon consideration of the following.

SUMMARY OF THE INVENTION

In many aircraft assembly operations, a major structural component is formed by connecting together at least two elongated parts. In the assembly of a skin panel, for example, a plurality of elongated stringers are attached to a skin sheet (see e.g. FIGS. 17 and 21 herein which correspond to FIGS. 2 and 5 of the '702 application). For the purpose of better understanding the disclosure of the invention as set forth here in the context of the '702 application, the present invention addresses the fastening of each individual stringer to the skin sheet. The skin sheet would be considered as one part while each stringer would be considered to be a second part. Clearly, this would be multiplied many times over for each of the many stringers making up the skin panel.

In the case of a wing spar, such as the type of spar disclosed in the '894 application, one part would be the web portion of the spar while the other would be one of the two curved spar chords extending along opposite edges of the web (see e.g. reference numerals 46, 48, 50 in FIG. 28 which corresponds to FIG. 3 of the '894 application). Utilizing the jigs disclosed in both applications permits fastener installation on a one-by-one basis. That is, the parts are held together by webbing straps in the case of the '702 application, and by vertical tooling posts in combination with Destaco clamps in the case of the '894 application. No interference or tack fasteners are used in either jig to hold the unfastened parts in proper position next to each other prior to final assembly. Both jigs permit sequential drilling and fastening and free part expansion ahead of the path of fastener installation.

The method of the invention includes defining a series of normal installation positions along the parts which are to be fastened together, where the parts are to be serially drilled and fasteners installed one at a time. In other words, a bore is drilled first at a certain position, which is followed by immediate fastener installation prior to drilling the next bore, and so on until a desired series of fasteners is installed.

At least one reference point is established forwardly of the path of advancement of drilling and fastening. This point or position is operatively connected to at least one of the parts in a manner so that the reference point moves in response to expansion or contraction caused by earlier installation operations. For example, drilling and fastening the parts together at a first one of the above-identified normal positions causes the reference point to consequently move. This movement is sensed as a linear displacement, or some mathematical function of a linear displacement. The next-inline normal drilling and fastening position is then determined, but is first adjusted prior to drilling by a certain amount that is proportionate to the displacement of the reference point. Thus, drilling and fastening at the next position is actually performed at an adjusted position which compensates for part growth. This substantially eliminates induced stresses and dimensional distortions.

The advantage of the present invention is that it ultimately decreases parasitic drag (and consequently, fuel burn) by eliminating structural contour deviations and "pillowing." It also improves the structural integrity and fatigue life of the finished assembly by substantially eliminating residual stresses introduced by existing manufacturing methods.

BRIEF DESCRIPTION OF THE DRAWINGS

In the drawings, like reference numerals and letters generally refer to like parts throughout the various views, except where otherwise indicated, and wherein:

FIG. 1 is a pictorial view of a header which is of a type disclosed in the '702 application and is used for assembling a wing skin panel, and illustrates how a gib key could be connected to a header for measuring displacement during practice of the method of the invention;

FIG. 2 is a fragmentary end view of the header and gib key shown in FIG. 1, and shows how the header and gib key may rest upon a post gibway, and move in response to part expansion as a skin panel is assembled;

FIG. 3 is a schematic side view of the parts making up a wing spar subassembly, and shows the position of the spar's web relative to its chord sections which extend along upper and lower edges of the web, and further shows displacement of a plurality of reference points which precede the path of fastener advancement as the chord sections are joined to the web;

FIG. 4 is similar to FIG. 3, but schematically illustrates how the displacement of the reference points shown in FIG. 3 could be sensed in accordance with the method of the invention;

FIG. 5 is a fragmentary side view of a fastened wing spar and illustrates part growth along two axes as a result of fastening in both horizontal and vertical directions;

FIG. 6 is a view like FIG. 2, but illustrates how part growth is monitored and how fastener installation is adjusted in response to part growth;

FIG. 7 is a schematic drawing showing the envelope of typical wing spars and how part growth may occur along three axes;

FIG. 8 is related to FIG. 7, and shows how tooling posts which hold a wing spar may move to permit part growth during assembly of the spar;

FIG. 9 is related to FIGS. 3, 4, 7 and 8, and shows a spar chord positioned adjacent the upper edge of a spar web;

FIG. 10 is a view like FIG. 9, but shows a different chord-to-web orientation;

FIG. 11 is a side elevational view of rollers which are mounted to the tooling posts shown in FIG. 8, and which orient a spar's chord relative to its web, the chord and web being shown in cross-section;

FIG. 12 is a view like FIG. 11, but shows a different chord-to-web orientation;

FIG. 13 is a pictorial view of the rollers shown in FIGS. 11 and 12;

FIG. 26 is like FIG. 1 of the '894 application, and is a pictorial view of a spar assembly jig having a plurality of generally vertically upstanding tooling posts, each of which is clamped to a portion of a wing spar that is to be assembled on the jig, and further shows horizontally traveling columns positioned on each side of the spar which drill and fasten the spar's parts together in accordance with the invention disclosed here;

FIG. 27 is like FIG. 2 of the '894 application, and is a view similar to FIG. 26, but with the horizontally traveling columns and wing spar removed;

FIG. 28 is like FIG. 3 of the '894 application, and is a view like FIG. 27, but shows a spar chord held in place by Destaco-style clamps and fixed registration pins on the various tooling posts;

FIG. 29 is like FIG. 4 of the '894 application, and is a view of one of the tooling posts shown in FIGS. 26-28.

BEST MODE FOR CARRYING OUT THE INVENTION

Referring first to FIGS. 1, 2 and 6, the invention will be described in the context of the generic wing panel assembly jig disclosed in the '702 application. FIG. 1 herein shows at 10 a "generic" header 12 which, when used in combination with a set of headers, is mounted to a jig frame 100 (see FIG. 20) and defines the airfoil profile of a wing skin panel. The header 12 has a plurality of notches 14, each of which receives a portion of a separate stringer (not shown in FIG. 1). Normally, the header 12 is mounted to the jig's frame by bolt attachment through openings 14, 16 in the header. This further described below.

Figure 14:
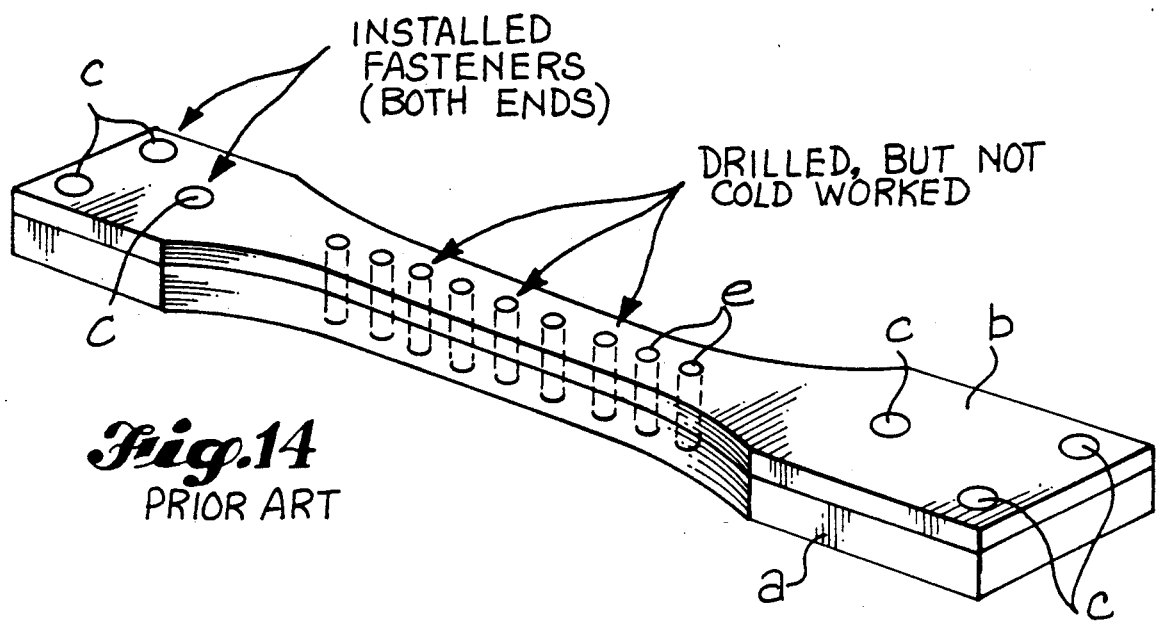
FIG. 14 is labeled "Prior Art" and shows a "coupon" where two parts are joined together by a plurality of fasteners.
Figure 15:
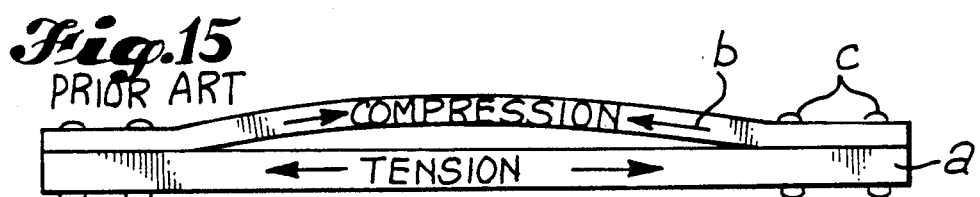
FIG. 15 is a side view of the coupon parts shown in FIG. 14, but illustrates, in exaggerated form, the effect of part expansion on two parts as they are joined together at their ends by interference fasteners.
Figure 16:
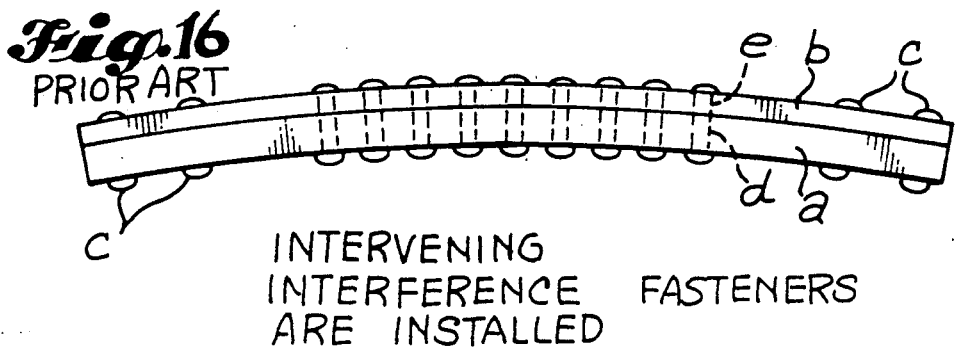
FIG. 16 is a side view of the parts shown in FIGS. 14 and 15, and shows the contour deviation induced by presently-used fastening methods.
Figure 17:
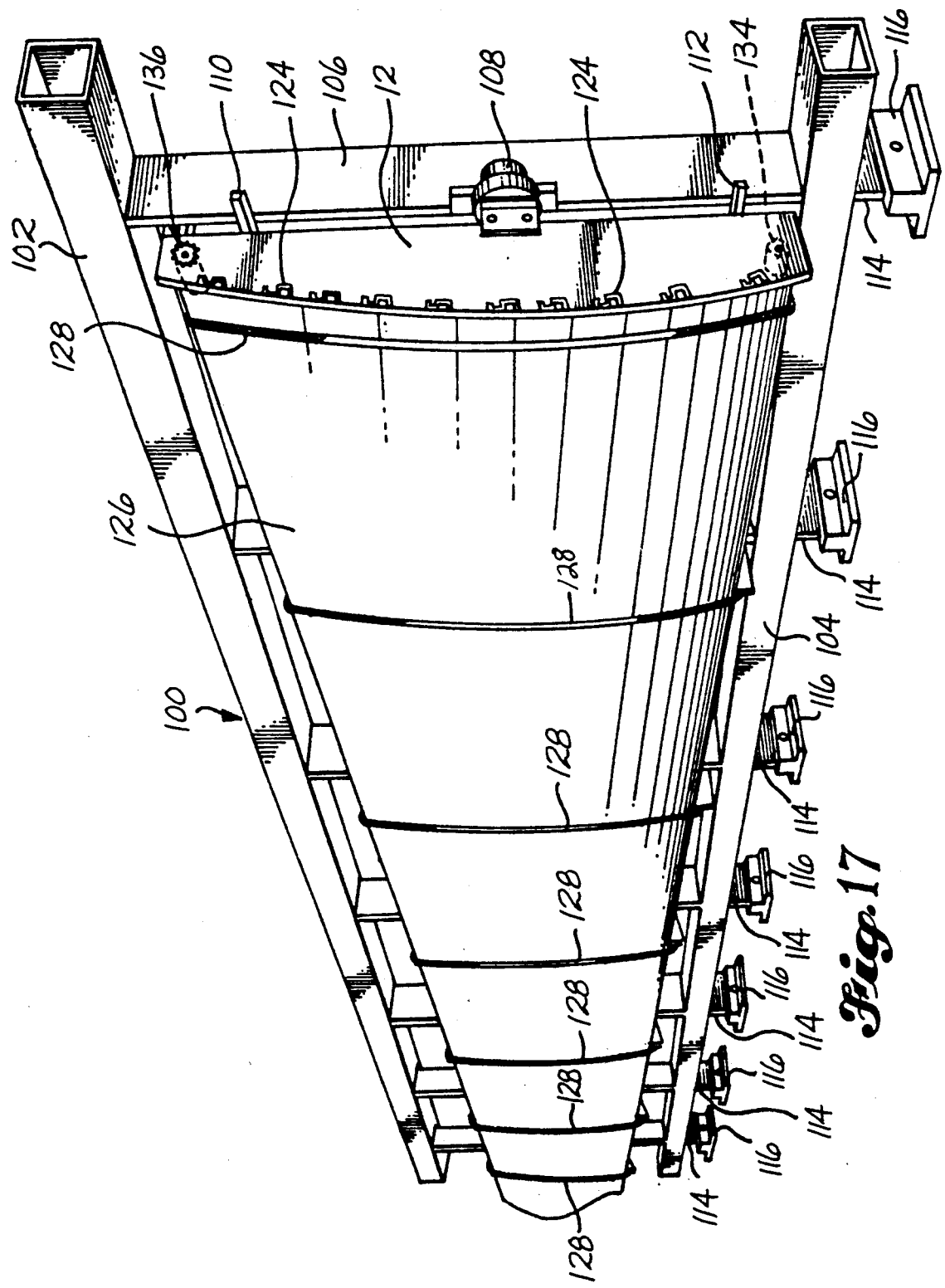
FIG. 17 is like FIG. 2 of the '702 application, and is a pictorial view of a skin panel assembly jig, and shows the jig mounted to an assembly frame which is seated in a floor space area.
Figure 18:
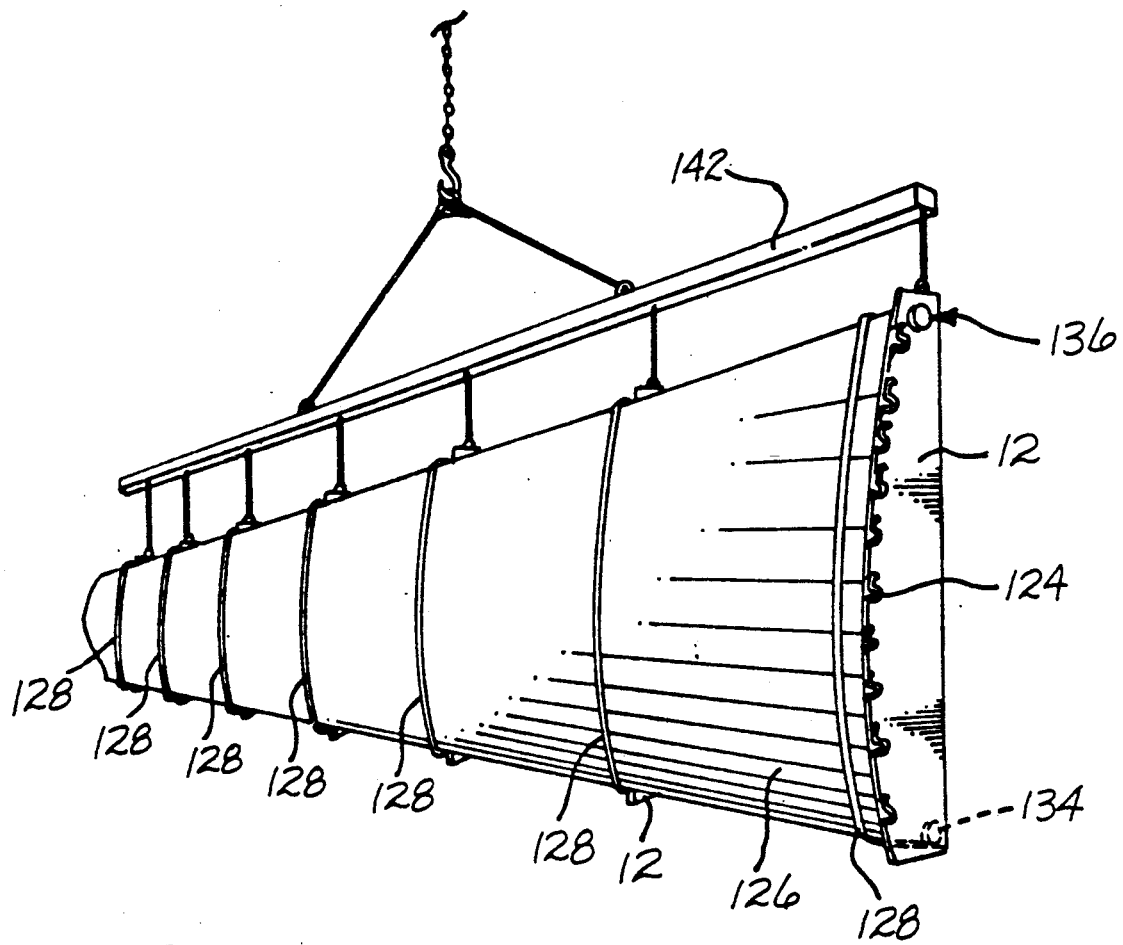
FIG. 18 is like FIG. 1 of the '702 application, and is a pictorial view of a wing skin panel assembly that is about to be assembled in accordance with the invention disclosed here, and shows the parts of a skin panel component held together and moved to another location where the panel's parts are to be fastened together.
Figure 19:
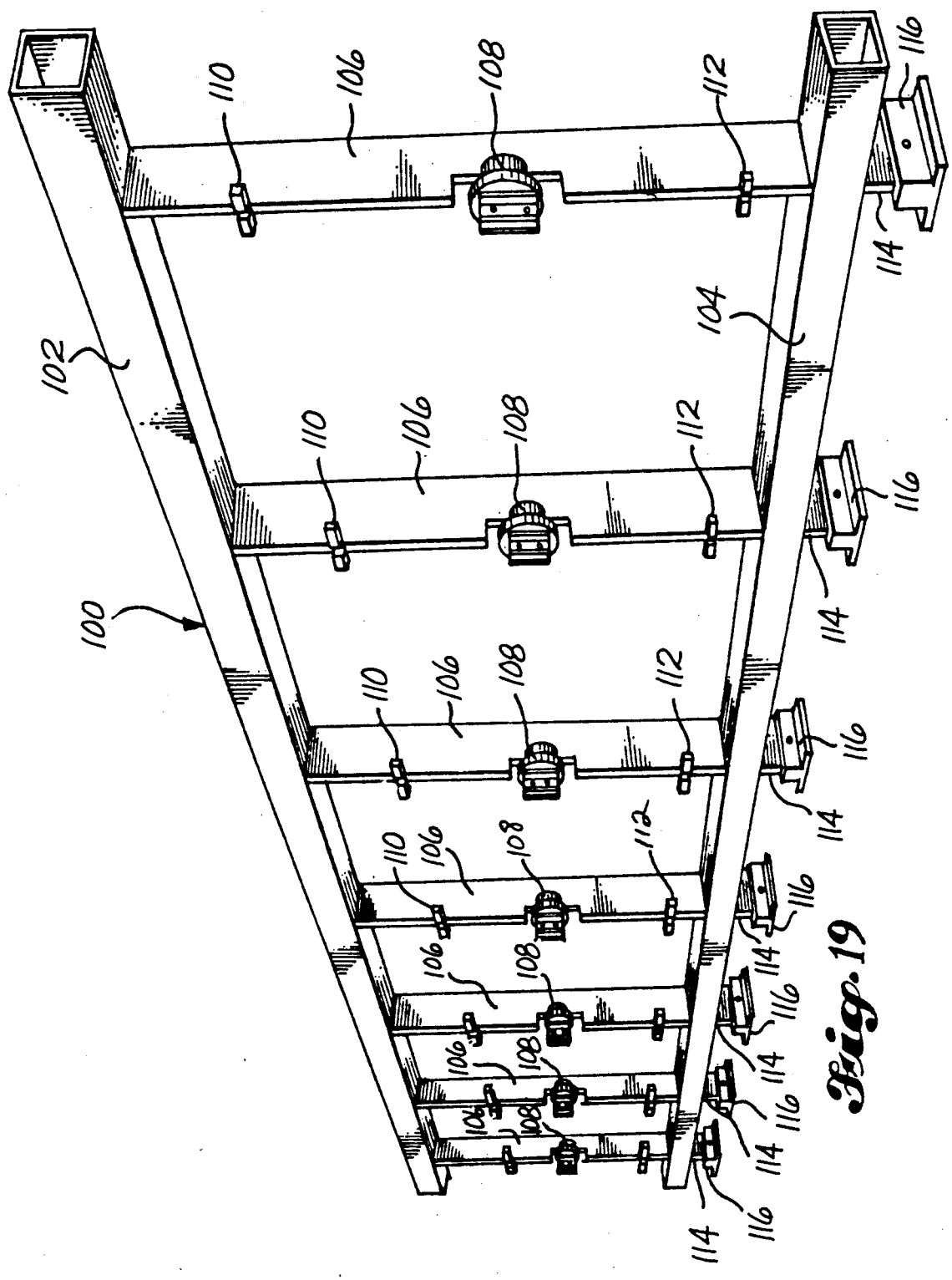
FIG. 19 is like FIG. 3 of the '702 application, and is a view like FIG. 17, but shows the jig frame alone, and shows where and how skin panel parts are attached to the jig frame.
Figure 20:
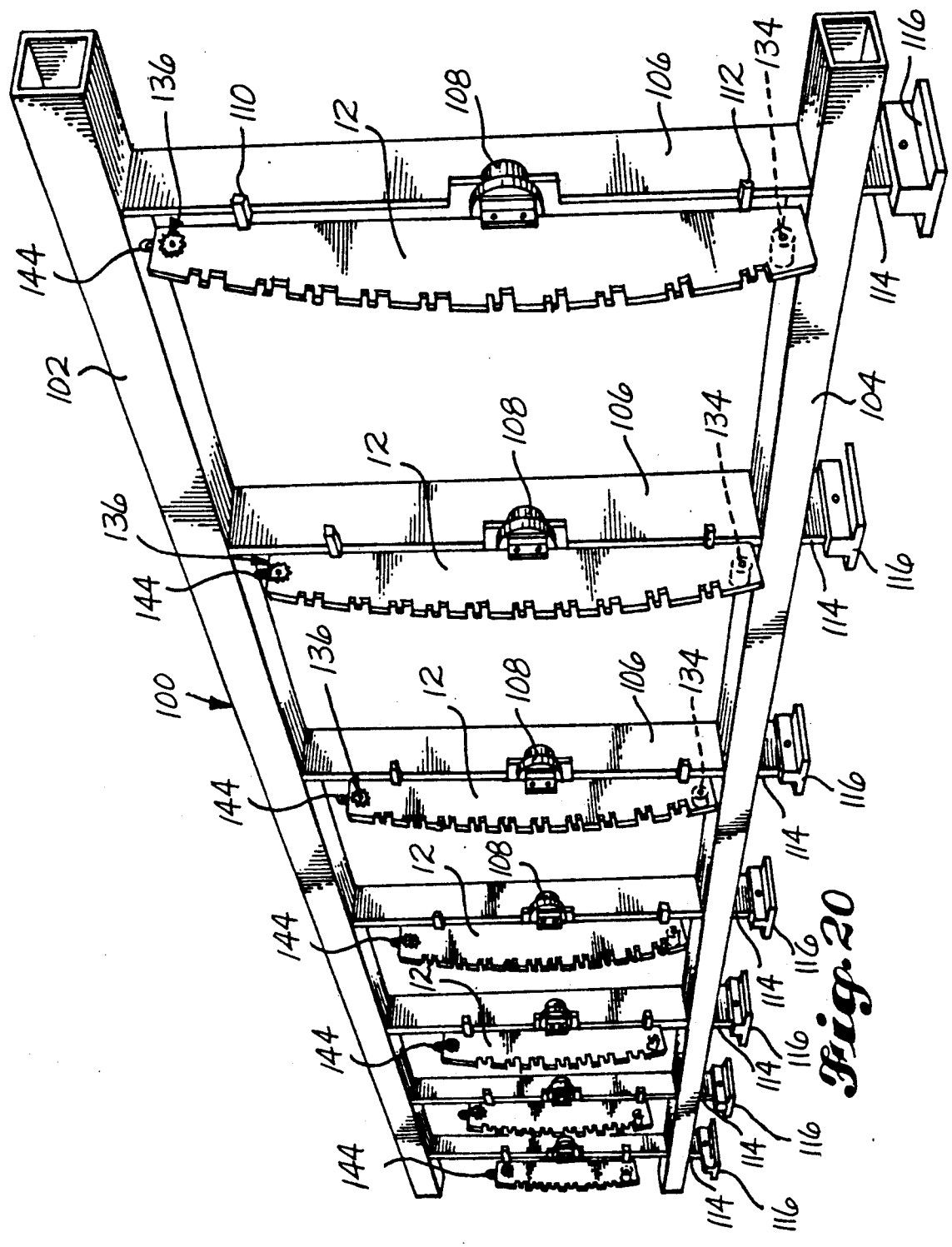
FIG. 20 is like FIG. 4 of the '702 application, and is a view like FIGS. 17 and 19 herein, but shows a set of headers mounted to the jig frame.
Figure 21:
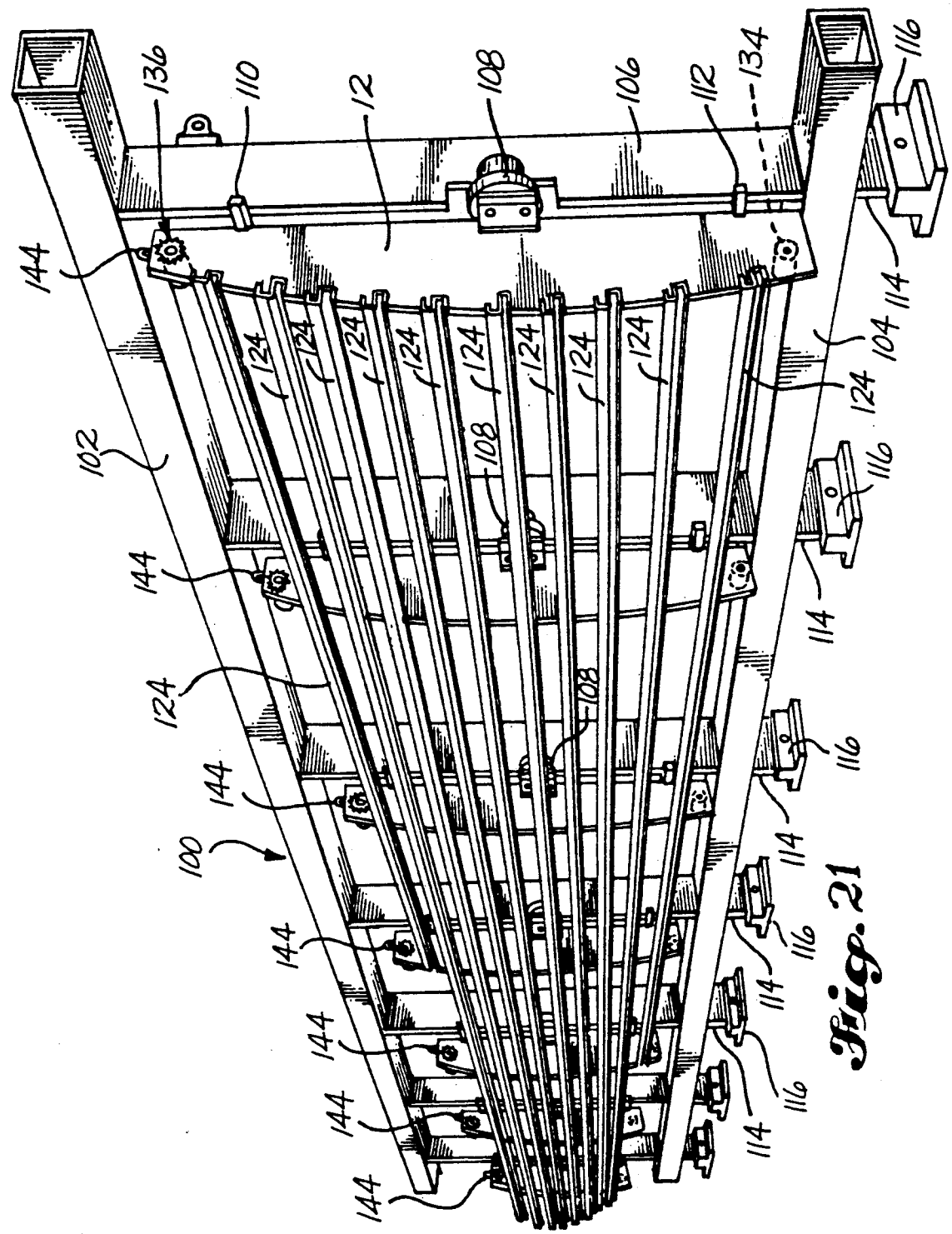
FIG. 21 is like FIG. 5 of the '702 application, and is a view like FIGS. 17, 19 and 20 herein, but shows stringers transversely positioned in header edge recesses or notches across the set of headers.

Directing attention briefly now to FIGS. 17-25 which correspond to FIGS. 1-10 of the '702 application, there the generic header 12 of FIG. 1 is shown as a set of headers attached to a jig frame 100 (see FIGS. 17, 20 and 21). It will be appreciated that, although the views depicted in FIGS. 17-25 here, are more or less identical to the views of the '702 application, the reference numerals are not identical. They have been changed to be consistent with the disclosure of the invention of the present case.

Briefly, the jig frame 100 has a pair of horizontal rails 102, 104 and a plurality of vertical posts, each of which is indicated by reference numeral 106 (see FIG. 19). Each post 106 has an attachment device 108, and slotted guide members 110, 112 on each side of the attachment device. Connected to the frame's bottom rail 104 are a plurality of downwardly-depending legs 114 which are received in footings 116 that are further mounted to a certain floor space.

Figure 22:
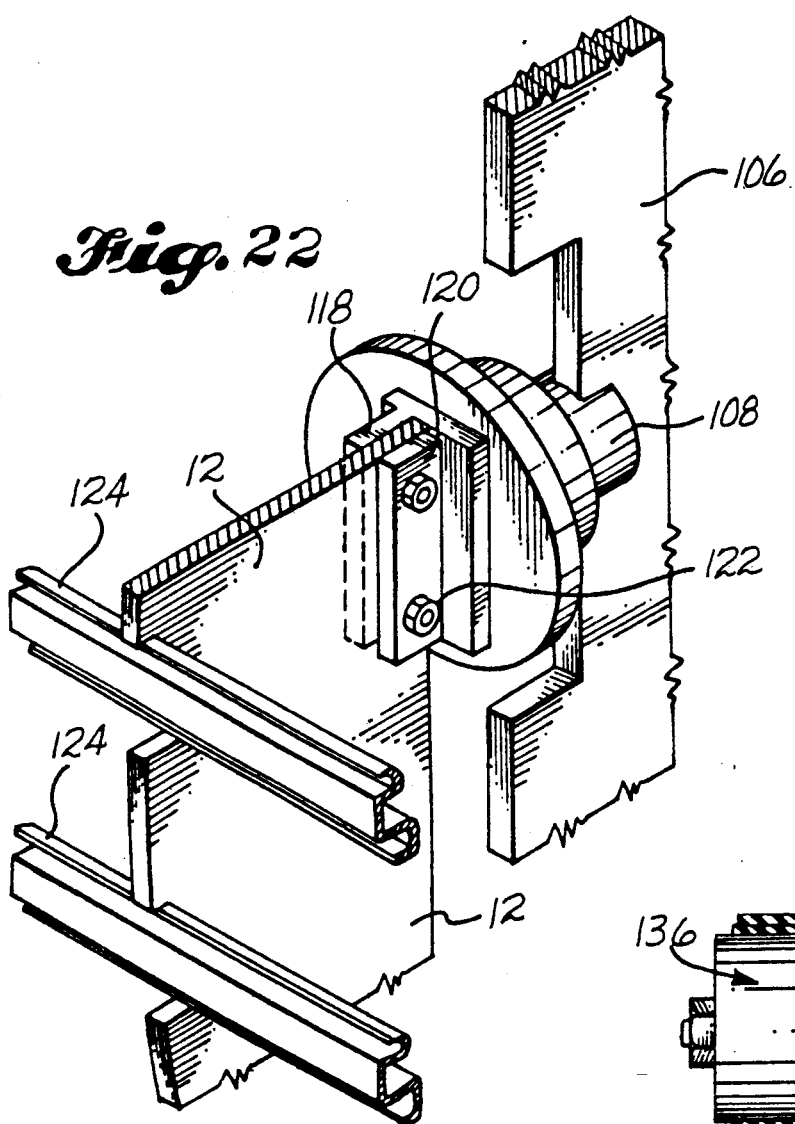
FIG. 22 is like FIG. 7 of the '702 application, and is an enlarged fragmentary pictorial view which shows an attachment point or attachment member where a header is connected to each of the frame posts shown in FIG. 19.
Figure 23:
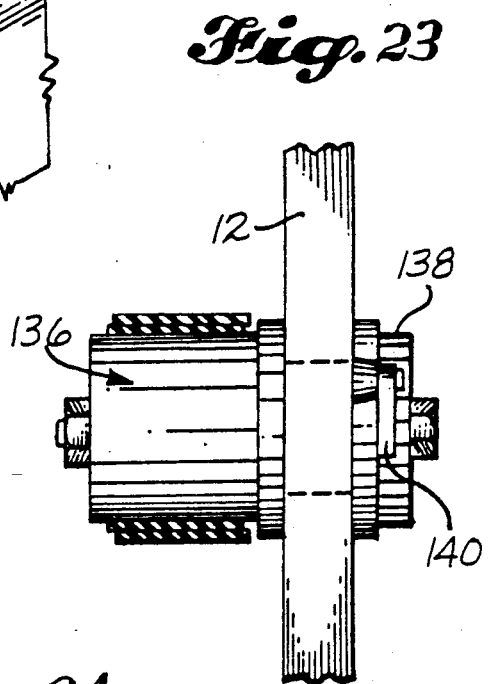
FIG. 23 is like FIG. 8 of the '702 application, and is a top view of a tightening spool which pulls one end of a webbing against a panel's skin sheet as shown in FIG. 17 herein.
Figure 25:
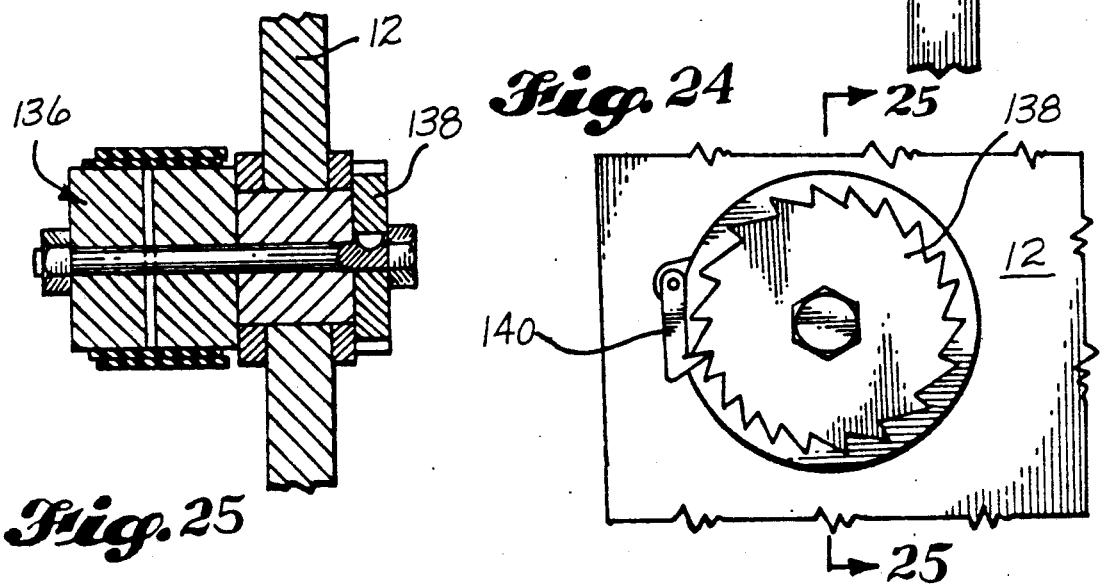
FIG. 25 is like FIG. 10 of the '702 application, and is a cross-sectional view of the spool shown in FIGS. 23 and 24 herein, and is taken along line 25—25 in FIG. 24.
Figure 24:
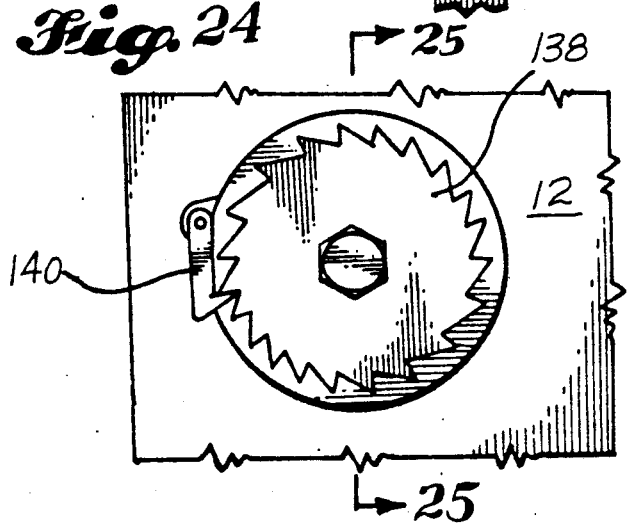
FIG. 24 is like FIG. 9 of the '702 application, and is a right-hand end view of the spool shown in FIG. 25.

When it is desired to assemble a particular skin panel, a set of headers 12 for that panel are first mounted to the frame's posts 106 (see FIG. 20). Each header 12 of the set is attached to an individual post 106 by an attachment device 108, which is best seen in FIG. 22. This device 108 is fixedly connected to each post 106 and has a fixed, forwardly-extending bracket 118 and a bar 120. Conventional nut-and-bolt assemblies 122 attach the header 12 to bracket 118 via header openings 14, 16 (see FIG. 1), thus fixing the header to the post 106.

Referring again to FIG. 20, slotted guides 110, 112 and attachment device 108 align each header 12 perpendicular to the centerline axis defined by the set of headers 12. Each guide 110, 112 is sufficiently close to its respective attachment device 108 so that they will align the shortest header 12 which is part of any set that is to be mounted onto frame 100.

Typically, after the headers 12 are attached to the frame 100, as shown in FIG. 20, a plurality of stringers 124 are placed across the headers 12 as shown in FIG. 21 (wherein reference numeral 124 indicates each stringer). As mentioned previously, the stringers 124 are received in header notches or recesses 14 (see FIG. 1).

After the stringers 124 are placed across the headers 12, a sheet of skin material 126 is then placed over the stringers. This is held in place by a plurality of webbings or straps, all of which are indicated by reference numeral 128 (see FIG. 17). Each strap's opposite ends are connected directly to its respective header 12. Preferably, the strap's lower end is connected to the header by means of a pin or fixed spool 134, or the like. Its upper end is connected to a rotatable cylindrical tensioning spool 136 (see FIGS. 23-25). The latter has a ratchet wheel 138 that is held in a given rotational position by a pawl 140. Tightening the spool 136 in one direction thus tightens the webbing 128 against the skin 126, which further pulls the skin tightly against the stringers 124 and headers 12.

To summarize the way the jig of FIGS. 17-25 is used, when a particular skin panel is to be assembled, a set of headers 12 is first attached to the jig frame 100 (see FIG. 20). Then, the stringers 124 are placed across the headers 12 in their respective notches 14 (see FIG. 21), and are temporarily clamped in place by conventional Destaco clamps (not shown in the drawings here). After that, the skin sheet 126 is placed over the stringers 124 and is held in place by the webbings 128 which are suitably tightened by the previously-described ratcheting spool 136 which is located on each header 12 (see FIG. 17). This is followed by moving the entire assembly of headers 12, stringer 124 and skin sheet 126 to a location where the skin is to be fastened to the stringers (see FIG. 18). Preferably, a boom 142 lifted by an overhead crane (not shown in the drawings) is used to lift this assembly by attachment to each individual header as shown at 144 in FIG. 20. Of course, such movement is accomplished only after each header 12 is first disconnected from its respective post 106 by loosening nut-and-bolt assemblies 122 of each attachment device 108.

At that point, each header 12, which has been detached from jig frame 100 along with the other headers of its respective set is provided with a registration bracket 17, 19 (see FIG. 1), which are hereafter referred to as registers 18. These are attached to the headers 12 in replacement of the previously-described attachment devices 108 in the manner shown in FIG. 1.

Each register 18 has a gib key 20 which rests in a guideway or gibway 22 on top of a post 24. This permits the header and register assembly 12, 18 to axially move or slide in one direction or another, as indicated by arrows 26, 28 in FIG. 2, during sequential installation of interference fasteners along each stringer 124. As a person skilled in the art would realize, a plurality of posts like post 24 would, of course, horizontally support a skin, stringer and header assembly (like that shown in FIG. 17) for automatic fastening by conventionally known methods.

By way of further explanation, as mentioned previously, each header 12 has a tightening assembly 134, 136 (see FIGS. 17 and 18) that tightens a webbing 128 over skin sheet 126. This presses the skin sheet 126 tightly against the curvature of the header. Of course, a plurality of stringers are first placed in the header's notches 14 and register against the inside surface of the skin 126. The header 12 consequently does not move relative to the skin sheet 126. However, the underlying stringer 34 is permitted by the webbing 128 to move relative to both (see FIG. 6).

As the skin sheet 126 is fastened to the stringer 124, both parts expand as a result of the fastening process. In particular, the stringer 124 is known to expand at a greater rate than the skin sheet 126. Using the jig arrangement of FIGS. 17-25 means that no tack fasteners are required to hold assembly parts together prior to sequential fastening. Hence, no tack fasteners interfere with the relative movement of these two parts, i.e. stringer 124 and skin sheet 126. The stringer 34 can slide along its respective header notch 14 underneath the skin 32 without any substantive restraint. Expansion of the skin sheet 32, however, causes the header 12 and its register 18 to slide along gibway 22 in post 24.

As a person skilled in the art would know, the skin sheet 126 is attached or finally assembled to the stringer 124 by a plurality of fasteners which extend along the length of these two parts. In the present invention, and referring again to FIG. 6, prior to the start of fastening, a plurality of normal positions, $X_1 \ldots X_n$ are first defined which indicate the desired position or location at which fasteners are to be installed. A reference point or position $X_r$ is defined at the position of the first header 12 in a particular set, which immediately precedes the direction of fastener installation or advancement, as indicated by arrow 36 in FIG. 6.

During the installation of a series of fasteners, the position of the header 12 is first determined prior to the installation of the first fastener of the series. Then the first bore is drilled through parts 126, 124 at the first one ($X_1$) of the predefined or selected normal drilling and fastening positions ($X_1 \ldots X_n$). This is followed by installation of a first fastener 38 which causes expansion of both parts 126, 124. The stringer 124 expands through its header notch 14 ahead of the skin sheet 126 independently of the sheet and header's movement. The expansion of the skin sheet 126 causes a displacement of the header 12 which is indicated by $\Delta X_1$. $\Delta X_1$ is calculated by measuring the difference between the inital reference position $X_r$ and its new position after displacement $X'_r$. In other words, $\Delta X_1 = |X'_r - X_r|$. $\Delta X_1$ could be suitably measured by a slider block indicator 40 and scale 41, which is placed on a plate 42 (see FIG. 2) that makes up the top of post 24.

When the next fastener 44 is to be installed, the predefined reference position ($X_2$) for the next installation is adjusted by the following equation:

$$X_2' = X_2 + \Delta X_1 \qquad \text{Equation (1)}$$

where $X_2'$ = adjusted next-in-line drilling position $X_2$ = initial predefined next-in-line normal drilling position $\Delta X_1$ = displacement of reference position measured after preceding drill and installation operation, and where $$\Delta X_1 = |X'_r - X_r| \qquad \text{Equation (2)}$$

and $X'_r$ = new position of reference position after displacement $X_r$ = initial reference position Therefore, the next fastener 44 is actually installed by first drilling a bore at a position which is adjusted as per the above equation ($X_2'$) and then installing at such position. This works parts 126, 124 a second time, and creates a secondary expansion or displacement of the header 12 which would be measured as $\Delta X_2$ by indicator and scale 40, 41 ($\Delta X_2$ would be calculated as $|X''_r - X_r|$ where $X''_r$ equals the new position of the reference point after the secondary displacement.

Such secondary displacement would then be used in the above equation to adjust the next following fastener installation ($X_3' = X_3 + \Delta X_2$), and so on, until the series reaches the position of header 12. At that point, the next header down the line (not shown) would become the next reference point until fastener installation reached such header, and such operation would repeat until the stringer 124 was attached to the skin sheet 126 all the way along its length, from one end of the skin panel to the other.

The above-described operation is suitable for wing skin panel assemblies where fasteners are installed substantially along a single axis. In other assembly operations, such as the assembly of a wing spar, for example, the path of fastener advancement can follow two or more axes.

Referring to FIG. 5, for example, there is shown enlarged fragmentary sections of a wing spar which include a web portion or web 46, upper and lower chords 48, 50 and transverse stiffeners 52. As the chords 48, 50 are fastened to the web 46, part growth occurs not only horizontally in the X direction, but also verticlaly in the Y direction. The method of the present invention is easily adapted to part growth and fastening control in either direction, or both at the same time.

Referring now to FIG. 26, therein is shown at 150 a generic wing spar assembly jig constructed, in accordance with the invention disclosed in the '894 application. The jig 150 includes a plurality of posts, each of which is indicated by reference numeral 51, whose ends are in sliding engagement with upper and lower tracks 152, 154 of the jig. The lower tracks 152 may be mounted directly to the floor of the work space in which the jig 150 is utilized. The upper tracks 154 may be connected directly to any suitable frame structure such as the overhead beam 156 shown in FIG. 26. As the skilled person would know, beam 156 would be further connected to other framework not shown in the drawings.

The posts 51 hold all the necessary components of a spar 158 to be assembled. This is best illustrated in FIG. 28. Fastening in accordance with the invention would be accomplished by a plurality of horizontally-traveling columns that are generally indicated at 160 in FIG. 26. These move along tracks 162 mounted to the floor of the workplace. The columns 160 are positioned on opposite sides of the posts 51, and provide a means for drilling, riveting and bucking the spar's components from either side. As a person skilled in the art would know these units are commercially available from several U.S machine tool manufacturers.

Figure 30:
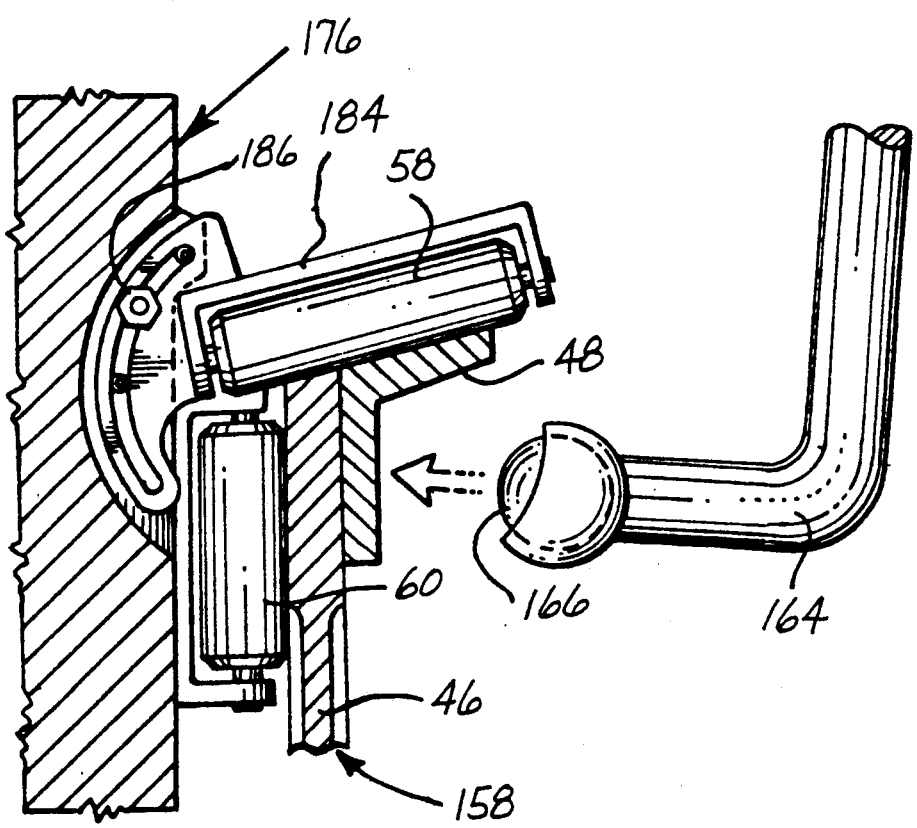
FIG. 30 is like FIG. 9 of the '894 application, and shows the end of a Destaco-style clamp moving into position against a spar chord, thereby holding the chord and an upper edge of a web tightly against rollers on the upper portion of a tooling post.

Referring to FIG. 28, the spar's web 46 is held by each post 51 and registered along the web's centerline by registration pins 56. At any post location, the spar chords, upper and lower 48, 50, are set by rollers 58, 60, 62 at an assigned vertical distance from the centerline location defined by pins 56 (see FIGS. 9-13). Vertical registration against these rollers 58, 60, 62 is induced by a Destaco clamp 164, which is best seen in FIG. 30. FIG. 30 also shows the clamp 164 as having a spherical ball end 166.

This arrangement of rollers 58, 60, 62 and Destaco clamp 164 not only establishes vertical registration of the upper and lower spar chords 48, 50 relative to the spar web centerline, but it also permits the spar chord material to actually move outward relative to the spar web 46 as a result of part expansion caused by the installation of interference fasteners. The allowance of movement of the chords 48, 50 relative to the web 46 is essential in order to substantially reduce or eliminate induced stresses in the chord's interference fasteners during attachment to the web 46.

As mentioned previously, the ends 168, 170 of posts 51 are slidably received in upper and lower tracks 152, 154. These ends also may slide transversely relative to the tracks 152, 154 by means of a small transverse rail 172 received in a track 174. This is best seen in FIG. 29. Referring to FIGS. 7 and 8, this permits accommodation of those kinds of spars which are not substantially two-axis systems. In other words, some spars have a transverse bend at one end, which is required by the unique geometry of the particular wing in which the spar is to be used. For this type of spar, tooling posts 51 would not be in alignment with each other in the "X" direction. Instead, they would have the configuration substantially as shown in FIGS. 7 and 8.

The previously-mentioned rollers 58, 60, 62 and a Destaco clamp 164, are mounted to upper and lower tool post carriages 176, 178. In order to accommodate different widths of the spar 158 to be assembled, these carriages are vertically adjustable by a fixed lead screw 180 that extends between upper and lower ends of each post. Each carriage 176, 178 preferably has an electrically operated nut drive 182, the construction of which would be familiar to the skilled person, that engages lead screw 180 for moving each carriage 176, 178 upwardly or downwardly, independently of the other.

FIG. 30 best illustrates the construction of rollers 58, 60, 62 and the way they are attached to tool post carriages 176, 178. Briefly, rollers 60, 62 are fixed in position and rotate about a vertical axis. Roller 58 rotates about an axis whose angle may be adjusted relative to the axes of rollers 60, 62. This is accomplished by a pivoting bracket member 184 whose position may be adjusted by simply tightening or loosening a nut 186.

The angular relationship between roller 58 and roller 60, 62 defines the position of the spar's web 46 relative to its upper and lower chords 48, 50 (see FIGS. 9-13). It should be appreciated that FIG. 30 shows the roller and clamp assembly for the upper tool post carriage 176.

As shown in FIGS. 11-13, the rollers 58, 60, 62 allow upper and lower spar chords 48, 50 to move freely relative to the web 46. The web 46 is secured to the tooling posts 5 along its centerline at 56. If the web 46 moves due to temperature changes, or growth as a result of part expansion caused by fastener installation, such movement may be detected by monitoring the sliding movement of tooling posts 51 along the "X" axis, in much the same manner as that which was previously described for the skin panel assembly shown in FIG. 6. That is, and referring now to FIGS. 3 and 4, each tooling post may have a slider block indicator 64, and a scale 66, suitably mounted adjacent the base of the tooling post. This would provide a displacement measurement for each post 51 as fastening is performed along the spar 158.

Similar to skin panel assembly, during spar assembly a plurality of predefined "X" positions are defined along the length of the spar from a zero part register ($X=0$). Reference positions for part movement would preferably be defined at the location of each tooling post ($X_{r1} - X_{rn}$). After installation of the first fastener, the position of the next fastener would be defined by the following equation which is essentially the same format as equation 1 above:

$$X'_{n+1} = X_{n+1} + \Delta X_n \qquad \text{Equation (3)}$$

where $X'_{n+1}$ = adjusted next-in-line drilling and fastening position $X_{n+1}$ = initial predefined next-in-line normal drilling position $\Delta X_n$ = displacement of tooling post at $X_m$ However, because the spar is typically a two-axis system, the "Y" chord values must also be adjusted to suit the newly-adjusted "X" position. This could be done by the following equation:

$$Y_n' = Y_n \pm \Delta X_n \tan \alpha \qquad \text{Equation (4)}$$

where $Y_n'$ = adjusted Y position compensating for web growth $Y_n$ = predefined normal Y position $\Delta X_n$ = displacement at reference point after drilling and installation $\alpha$ = angle of chord relative to horizontal The angle $\alpha$ is defined by the angle of the chord's upper flange surface 68 relative to the horizontal (see FIG. 9). As with the "X" position, the "Y" position is adjusted after each drilling and fastener installation.

With the above spar assembly method, fasteners are installed without anticipating spar growth, and the true spar chord contour is maintained from start to completion of the assembled spar. As a person skilled in the art would realize, and as mentioned previously, it would be possible to further adapt the method of the invention to include a third axial direction depending on the configuration of the spar. Some spars, for example, have an inboard portion which extends at an angle relative to the outboard portion (see FIGS. 7 and 8). This would be handled in the same fashion as that which was described above for growth in the "X" direction. That is, a reference position would be selected along the "Z" axis ahead of fastener advancement, and drilling and installation positions would be adjusted in accordance with movement of the reference point as per Eq. 2 above.

The preceding consitutes the best mode for carrying out the invention as it is presently known. Clearly, it is conceivable the invention could be changed in many ways without departing substantially from its spirit and scope. The invention is well-suited for adaptation to machinery which employ conventional numerical control and feedback systems. Utilizing the invention will result in better made aircraft components having longer fatigue life. It is to be understood the invention is not to be limited by the preceding description, but rather is to be limited only by the subjoined claim or claims which follow.

What is claimed is:

1. For use in assembling an aircraft structural component, a method for connecting together at least two parts of such component by sequentially drilling holes into said parts and installing a series of fasteners, one at a time into said holes, advancing along a line from a beginning position to an ending one, the improvement comprising:

(a) permitting said parts to freely expand or contract relative to each other without any substantive restraint ahead of the line of advancement of said sequential drilling and installation of said series of fasteners;

(b) defining a series of normal positions along said parts where said parts are to be sequentially drilled and fasteners installed along said line of advancement;

(c) defining at least one reference point forwardly of said series of normal positions, said reference point being operatively connected to at least one of said parts in a manner so that said reference point moves in response to expansion or contraction of said at least one of said parts;

(d) drilling a hole into said parts and fastening said parts together at one of said defined normal positions by inserting a fastener into said hole, such drilling and installing causing said parts to expand or contract relative to each other;

(e) sensing the displacement of said at least one reference point as a result of part expansion or contraction caused by the drilling and fastening of the previous step;

(f) determining a normal next-in-line drilling and fastening position of said series of normal positions;

(g) determining an adjusted next-in-line drilling and fastening position by adjusting said normal next-in-line normal position as determined in step (f) above by a certain amount proportionate to the displacement of said at least one reference point as sensed in step (e) above; followed by (h) drilling a hole into said parts at said adjusted next-in-line position as determined in step (g) and fastening said parts together by inserting a fastener into said hole; followed by (i) repeating steps (e) through (h) until sequential drilling and installing of a selected number of fasteners is completed.

2. The method of claim 1, wherein adjusting the next-in-line drilling and fastening position in step (g) includes adjusting the next-in-line normal position as determined in step (f) by an amount that is linearly proportionate to the displacement of said at least one reference point.

3. The method of claim 1, including defining a plurality of reference points along a line forwardly of the advancement of drilling and fastening, each one of said reference points being operatively connected to at least one of said parts in a manner so that each reference point moves in response to expansion or contraction of said at least one of said parts, and wherein sensing the displacement of said at least one reference point as set forth in step (e) of claim 1 includes sensing the displacement of a first one of said plurality of reference points followed by repeating steps (e) through (h) as set forth in claim 1 until drilling and fastening advancement reaches said first one of said plurality of reference points, and thereafter sensing the displacement of said at least one reference point as set forth in step (e) of claim 1 includes sensing the displacement of a next-in-line reference point of said plurality of reference points.

* * * * *